US008839239B2

(12) United States Patent
Raj et al.

(10) Patent No.: US 8,839,239 B2
(45) Date of Patent: Sep. 16, 2014

(54) PROTECTION OF VIRTUAL MACHINES EXECUTING ON A HOST DEVICE

(75) Inventors: Himanshu Raj, Issaquah, WA (US); Paul England, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 480 days.

(21) Appl. No.: 12/815,415

(22) Filed: Jun. 15, 2010

(65) Prior Publication Data

US 2011/0307888 A1 Dec. 15, 2011

(51) Int. Cl.
*G06F 9/455* (2006.01)
*G06F 21/74* (2013.01)

(52) U.S. Cl.
CPC ............ *G06F 21/74* (2013.01); *G06F 9/45558* (2013.01); *G06F 2009/45587* (2013.01)
USPC .......................................................... 718/1

(58) Field of Classification Search
USPC ............... 711/147, 153, 168; 718/1; 719/319, 719/320, 328
See application file for complete search history.

(56) References Cited

U.S. PATENT DOCUMENTS

| 6,941,436 | B2 * | 9/2005 | Lee et al. ....................... 711/173 |
| 7,409,719 | B2 | 8/2008 | Armstrong et al. |
| 7,865,893 | B1 * | 1/2011 | Omelyanchuk et al. .......... 718/1 |
| 8,112,524 | B2 * | 2/2012 | Logan et al. .................. 709/226 |
| 8,156,298 | B1 * | 4/2012 | Stubblefield .................. 711/163 |
| 8,176,336 | B1 * | 5/2012 | Mao et al. ...................... 713/189 |
| 2006/0236127 | A1 | 10/2006 | Kurien et al. |
| 2007/0266389 | A1 * | 11/2007 | Ganguly et al. .............. 718/104 |
| 2010/0037296 | A1 | 2/2010 | Silverstone |
| 2010/0077128 | A1 * | 3/2010 | Stansell et al. .................... 711/6 |
| 2010/0281273 | A1 * | 11/2010 | Lee et al. ...................... 713/190 |

OTHER PUBLICATIONS

Srivastava, et al., "Kernel Data Integrity Protection via Memory Access Control", Retrieved at << http://smartech.gatech.edu/bitstream/1853/30785/1/GT-CS-09-04.pdf <<, Georgia Institute of Technology, SCS Technical Report, 2009, pp. 1-20.

Yang, et al., "Using hypervisor to provide data secrecy for user applications on a per-page basis", Retrieved at << http://kabru.eecs.umich.edu/papers/publications/2008/yang08usinghypervisor_vee.pdf <<, ACM/Usenix International Conference on Virtual Execution Environments, Proceedings of the fourth ACM SIGPLAN/SIGOPS international conference on Virtual execution environments, Mar. 5-7, 2008, pp. 10.

(Continued)

*Primary Examiner* — H S Sough
*Assistant Examiner* — William C Wood
(74) *Attorney, Agent, or Firm* — Steve Wight; Peter Taylor; Mickey Minhas

(57) ABSTRACT

Technology is described for protection of virtual machines executing on a host device having host processors and host memory. The system can include a hypervisor configured to enable the virtual machines to execute concurrently on the host device. An emancipated partition can be provided with a communication channel to the hypervisor. A primary partition can be configured to interface with the emancipated partition through the communication channel via the hypervisor. In addition, an emancipated memory space and virtual register state for the emancipated partition can be protected from direct access by the primary partition.

20 Claims, 6 Drawing Sheets

(56) References Cited

OTHER PUBLICATIONS

Porquet, et al., "Multi-compartment: A new architecture for secure co-hosting on SoC", Retrieved at << http://www-asim.lip6.fr/pub/reports/2009/ar.porqu.soc.1.2009.pdf >>, 11th International Symposium on System-on-Chip (SoC'2009), Oct. 2009, pp. 4.

Xu et al., "Towards a VMM-based usage control framework for OS kernel integrity protection", Retrieved at << http://www.list.gmu.edu/mxu/sacmat07.pdf <<, Symposium on Access Control Models and Technologies, Proceedings of the 12th ACM symposium on Access control models and technologies, Jun. 20-22, 2007, pp. 10.

Berger, et al., "TVDc: managing security in the trusted virtual datacenter", Retrieved at << http://kiskeya.org/ramon/work/pubs/osr08.pdf <<, ACM SIGOPS Operating Systems Review, vol. 42, No. 1, Jan. 2008, pp. 8.

\* cited by examiner

PROTECTION OF VIRTUAL MACHINES EXECUTING ON A HOST DEVICE

BACKGROUND

Due to the interest in hosted computing and cloud computing, many computing environments can provide virtualization of hosted operating systems. In such virtualization environments, a hypervisor can allow multiple operating systems to run concurrently on a host computer. Another name for a hypervisor may be a virtual machine monitor (VMM). A hypervisor can be thought of as a core of a virtualization platform, and the hypervisor typically has access to and manages the access to the physical host hardware. In addition, a hypervisor can access and manage privileged partitions, such as a primary partition, which can be used for management and I/O virtualization purposes.

The hypervisor can present guest operating systems or guest partitions with a virtual platform and can monitor the execution of the guest operating systems. In that way, multiple operating systems, including multiple instances of the same operating system, can share hardware resources. The virtual machine approach using a hypervisor can isolate failures in one operating system from other operating systems sharing the hardware.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. While certain disadvantages of prior technologies are noted in this disclosure, the claimed subject matter is not to be limited to implementations that solve any or all of the noted disadvantages of the prior technologies.

Various embodiments are described for protection of virtual machines executing on a host device having host processors and host memory. The system can include a hypervisor configured to enable the virtual machines to execute concurrently on the host device. An emancipated partition can be provided with a communication channel to the hypervisor. A primary partition can be configured to interface with the emancipated partition through the communication channel via the hypervisor. In addition, an emancipated memory space and virtual register state for the emancipated partition can be protected from direct access by the primary partition. The emancipated memory space can be protected by modifying the GPA-to-SPA map (guest physical address-to-system physical address map) for the primary partition so the primary partition cannot access emancipated partition memory. This modification can result in the primary partition's memory pointers to the emancipated partition's memory areas being pointed to a decoy page which can restrict the primary partition's access to the emancipated partition's memory.

In one embodiment, a virtualized I/O channel can be provided between the primary partition and the emancipated partition. The hypervisor can selectively disable protection of memory pages to provide the virtualized I/O channel. A release module may also be in communication with the hypervisor to enable the emancipated partition to leave an emancipated state by removing protections managed by the hypervisor around resources used by the emancipated partition.

DETAILED DESCRIPTION

Figure 1:
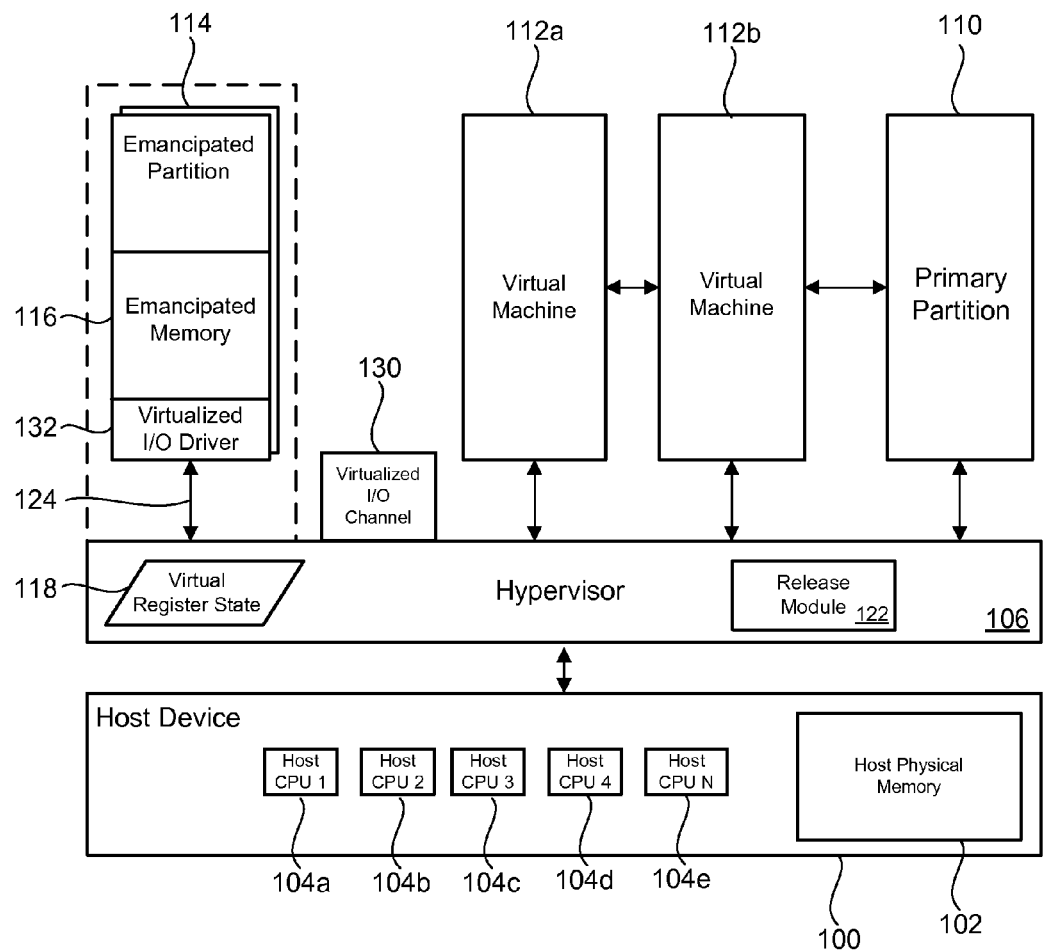
FIG. 1 is a block diagram illustrating an embodiment of a system for protection of virtual machines executing on a host device.

Reference will now be made to the exemplary embodiments illustrated in the drawings, and specific language will be used herein to describe the same. It will nevertheless be understood that no limitation of the scope of the technology is thereby intended. Alterations and further modifications of the features illustrated herein, and additional applications of the embodiments as illustrated herein, which would occur to one skilled in the relevant art and having possession of this disclosure, are to be considered within the scope of the description.

Current virtualized systems do not typically provide a high level of confidentiality or integrity to executing guest partitions (virtual machines) against a privileged primary partition. Malicious privileged users and malware on the primary partition may jeopardize a guest partition's execution state since the primary partition has control over the guest partition's virtualized state. Remote parties may desire to deploy a specific virtual machine and desire to be ensured that the remote party's application code and data are not likely to be compromised by a corrupt or malicious primary partition. Lack of protection controls for the guest partitions or guest virtual machines can inhibit building trustworthy virtualized platforms.

A technology is described that provides hypervisor related mechanisms and processes for protecting guest partitions (or virtual machines VMs) in a virtualized platform with operating systems executing in a virtualized environment. A primary partition is generally used to aid in managing of the virtualized platform. The hypervisor mechanisms can configure the virtualized environment so the primary partition is not able to directly change the memory contents of an executing guest partition that has been emancipated from the primary partition. Some defined areas of memory can be designated by an emancipated guest partition and/or the hypervisor for input and output with the primary partition and other guest partitions. The primary partition can also be restricted from changing the virtualized register state of the emancipated guest partition unless such requested changes are routed through and validated by the hypervisor. While a high level overview of the technology has just been described, additional details of this technology are described below.

FIG. 1 illustrates a system for protection of virtual machines 112*a-b* executing on a host device 100 having host processors 104*a-e* and host memory 102. FIG. 1 illustrates an abstract representation of resources in the system for protection of virtual machines, while further implementation details may be shown in later figures. The system can include a hypervisor 106 configured to enable the virtual machines to execute concurrently on the host device. The virtual machines can execute as a guest partition that is a logical unit of isolation supported by the hypervisor, in which an operating system environment can execute. For example, the virtual machines or guest partitions may be running a version of Windows Server™, Unix, or another existing operating system.

A hypervisor instance can also interface with at least one privileged partition, e.g., the primary partition 110. A virtualization stack for a guest partition has typically executed in the primary partition and had direct access to the hardware devices. The primary partition may also be running a version of Windows Server™, Unix, or another existing operating system. The primary partition can create guest partitions which host the guest operating systems. A primary partition can create guest partitions using an API (application program interface), such as the hypercall API. When the primary partition creates the guest partitions, then the primary partition becomes part of the guest partition's trusted computing base (TCB).

A virtualized partition does not generally have access to the physical processor, nor does the virtualized partition handle the real interrupts for the virtualized partition. Instead, the virtualized partition may have a virtual view of the processor and can run in guest virtual address mode, which may not necessarily be the entire virtual address space depending on the configuration of the hypervisor. A hypervisor can choose to expose just a subset of the processors to each partition. The hypervisor can handle the interrupts to the processor and redirect the interrupts to the appropriate partition. In addition, the hypervisor may hardware accelerate the address translation between various guest virtual address-spaces by using an I/O memory management module which operates independently from the memory management hardware used by the processors or CPUs (central processing units).

Guest partitions do not generally have direct access to hardware resources, but instead have a virtual view of the resources and virtual devices. Any request to the virtual devices is redirected to the devices in the primary partition, which can manage the requests. For example, the redirection may take place using a VMBus as a logical channel which enables inter-partition communication. A response can also be redirected via the VMBus.

In some example configurations, a primary partition can run a Virtualization Service Provider (VSP), which connects to the VMBus and handles device access requests from guest partitions. Guest partition virtual devices may internally run a Virtualization Service Client (VSC), which can redirect the request to VSPs in the primary partition via the VMBus. This entire process can be transparent to the guest operating system.

The system can include a plurality of emancipated partitions 114 with a communication channel 124 to the hypervisor 106. An emancipated partition can be a guest partition that has been emancipated from direct access by the primary partition. The details for emancipating a guest partition will be described later. The primary partition 110 can interface with an emancipated partition through the communication channel via the hypervisor.

An emancipated memory space 116 for the emancipated partitions 114 can be provided and these emancipated areas can be protected from direct access by the primary partition 110. In the emancipated configuration, the primary partition can be restricted from changing the memory contents of an emancipated partition, except for some selected memory access cases. For example, some memory areas may be designated by the emancipated partition and hypervisor for input and output (I/O).

A virtual register state 118 can be located in the hypervisor 106. The primary partition can be restricted from changing the virtual register state of the emancipated partition, except in response to hypervisor controlled intercepts. Thus, the hypervisor can provide mechanisms that enforce access control over the virtual register state and memory contents of an emancipated partition based on the emancipated partition's designated status.

The hypervisor mechanisms that protect the memory space and virtual register state of the partitions from the primary partition can create emancipated partitions. These mechanisms to protect the emancipated partitions (previously the guest partitions) from the primary partition have not previously existed in virtualized platforms. Without the emancipation protections, the primary partition has previously had complete access to virtualized resources of a partition in previous virtualized platforms. Such unfettered access by the primary partition to guest partitions can allow a malicious entity, such as malware or a rogue administrator to alter the execution and/or data of the unprotected partition. The present technology provides mechanisms to enable the creation of emancipated partitions, where the primary partition has controlled or limited access to an emancipated partition.

To protect the emancipated partition's memory, page-table based mechanisms can be used to take away the primary partition's permissions and/or ability to read and write memory pages that map to the guest partition's physically addressable memory range. For the virtualized register state, access controls may be enforced by the hypervisor based on the designation of the memory page accessed for the destination partition. If a certain partition is designated as emancipated, un-warranted access to the virtualized register state can be denied. Such access can be allowed when specifically warranted by the hypervisor or the access is legitimately requested through the hypervisor. These protection mechanisms can be part of the emancipation architecture, and a partition executing with these protections can be called an emancipated partition.

A virtualized I/O channel 130 can be provided between the primary partition and an emancipated partition. The hypervisor can selectively disable protection of memory pages to provide the virtualized I/O channel as determined by the hypervisor. An interface provided by the hypervisor to an emancipated partition can also allow the emancipated partition to indirectly and selectively enable and disable protection of the memory pages for the emancipated partition. The hypervisor may export an API to the operating system kernel of the emancipated partition to access these mechanisms and to selectively disable protection for the emancipated partition's memory pages. An unprotected memory page can then be accessed by the primary partition to copy data in/out of these memory pages, which forms the basis of communication between the emancipated guest partition and the primary partition. An emancipated partition can then put explicitly protected data in these unprotected memory pages as needed.

This selective management of memory protection for the emancipated partition enables virtualized I/O based on shared memory communication between the emancipated partition and the primary partition. The responsibility of protecting the confidentiality and integrity of the information transferred using the unprotected I/O channels then rests with the emancipated partition through the use of other protection processes, such as encryption.

In one I/O example, virtualized I/O device drivers 132 running in an emancipated partition can provide the ability to copy data in and out of the virtualized I/O channel 130 (i.e., unsecure communication channel) between the guest partition and the primary partition in a manner that can preserve confidentiality and integrity of the data. For example, by using encryption, the I/O device drivers for the emancipated partition may ensure that data sent over the unsecure communication channel cannot be seen by the primary partition. Further, the I/O device drivers for the emancipated partition can use integrity protection data structures to ensure that data accessed via the virtualized I/O channel has not been modified. By using integrity protection data structures, such as a merkle hash tree, an emancipated partition can ensure that data sent over the unsecure communication channel was not altered by the primary partition, another guest partition, or some other malware. The virtualized I/O channel allows the emancipated partition to communicate with the primary partition in a manner that preserves the confidentiality and/or integrity of the communicated content.

In one embodiment, a release module 122 can be provided that is in communication with the hypervisor. The hypervisor can provide the capability and corresponding unemancipation API to completely remove the protection around the emancipated partition. Removing the protections from the emancipated partition can be defined as unemancipation. The release module may enable the emancipated partition to leave an emancipated state and return to an unprotected guest partition state by removing protections managed by the hypervisor from resources used by the emancipated partition. In one embodiment, the unemancipation API is just made available to an emancipated partition to unemancipate itself. Leaving the emancipated state may remove some or all of the protections erected by the hypervisor around the resources of the guest partition. In addition, leaving the emancipated state may then allow the primary partition access to the then unprotected guest partition's resources and can put the primary partition back in guest partition's trusted computing base (TCB).

The process for unemancipation may include certain operations to protect the sensitive data in the emancipated partition. Before the emancipated partition leaves the emancipated state, the emancipated partition can remove or erase any protected or private information contained by the emancipated partition. For example, there may be private encryption keys for communication or e-commerce keys that may need to be erased before the request is made by the emancipated partition to leave the emancipated state. Other examples of such private data that may desired to be erased before the emancipated state is terminated may include credit card numbers, social security numbers and other private information.

In a situation where an emancipated partition is stopping execution, the emancipated partition can remove private information from the emancipated partition's memory and registers, and then the unemancipation API can be used by the emancipated partition to remove protection around its resources. The unemancipation process may also enable the primary partition to reclaim the resources in use by the emancipated partition after the emancipated partition has finished execution. Of course, an emancipated partition may also remove its protection for other reasons such as mass memory transfer or other tightly integrated functions.

The hypervisor may use page-table checking to determine areas of memory a primary partition is able to access. Accordingly, the hypervisor can use page-table checking to block primary partition access to memory pages owned by the emancipated partition. Particularly, the emancipated partition's memory space can be protected by the hypervisor by setting the addresses for the emancipated partition's emancipated memory space in the GPA-to-SPA map (Guest Physical Address to System Physical Address) of the primary partition to point to a decoy page. In a similar fashion, the hypervisor can protect the hypervisor's own memory from the primary partition by setting addresses for the hypervisor's memory in the GPA-to-SPA map (Guest Physical Address to System Physical Address) of the primary partition to point to a decoy page.

Figure 2:
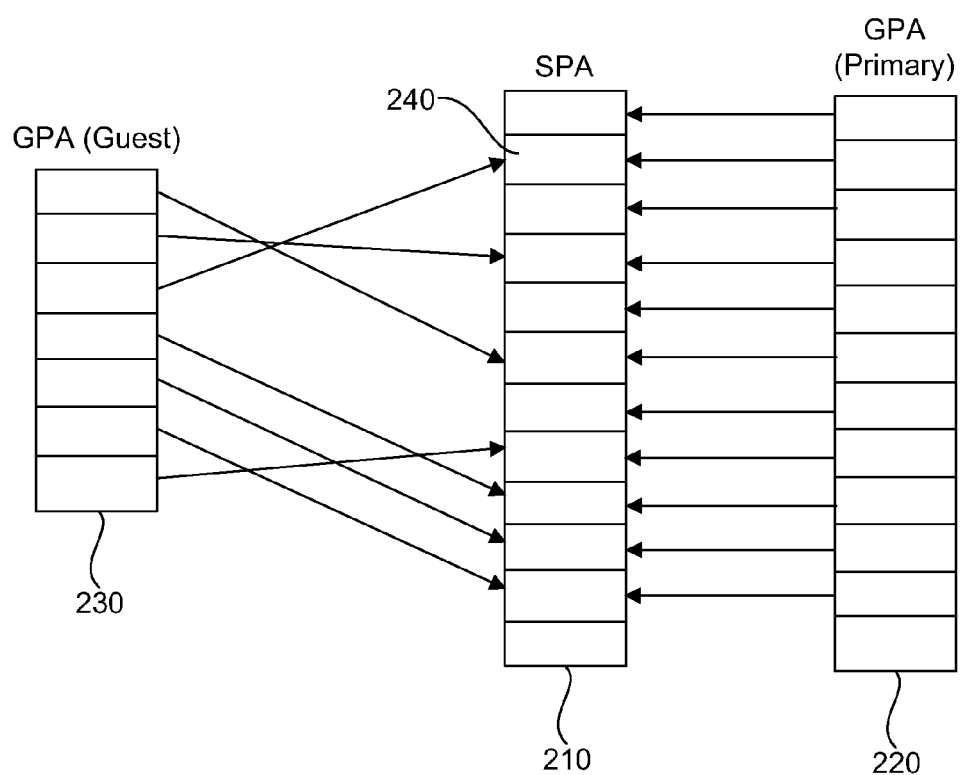
FIG. 2 illustrates an embodiment of memory access available to the primary partition and guest partition.

FIG. 2 illustrates the physical memory access or system physical address (SPA) 210 available to the primary partition 220 and the guest partition 230. The page tables that control which memory areas may be accessible to a partition can be based on the GPA-to-SPA map (guest physical address-to-system physical address map). In this example, the primary partition is able to access the memory pages 240 assigned to a guest partition or virtual machine. When the primary partition is able to access the guest partition's memory without restrictions, then the integrity of the memory pages may be compromised.

Figure 3:
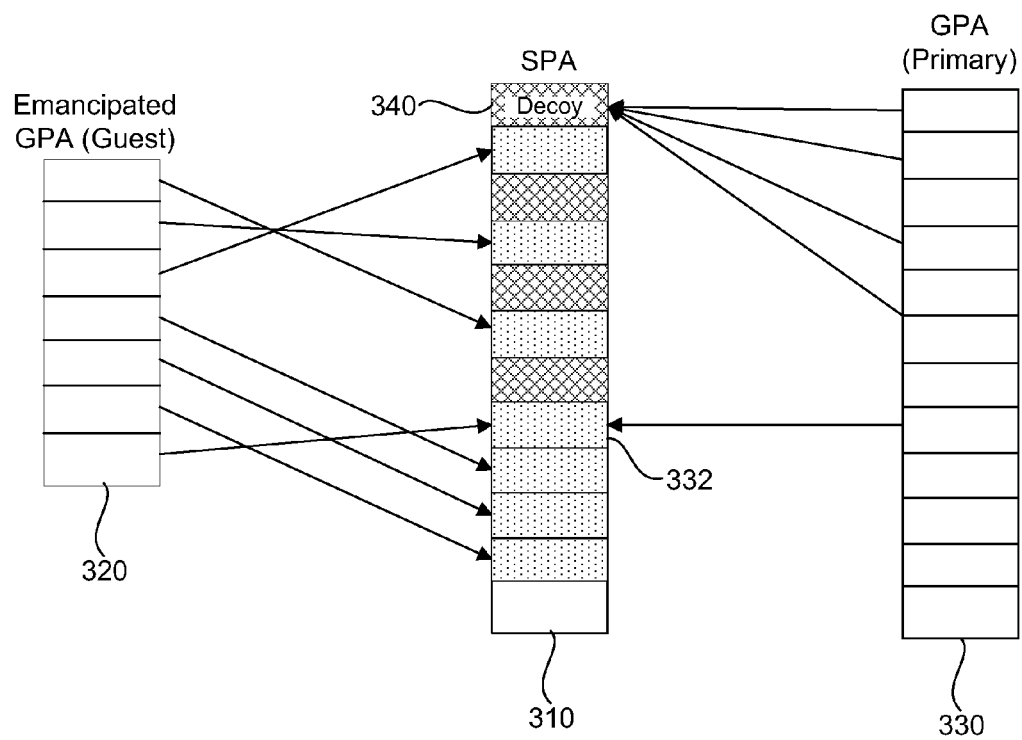
FIG. 3 illustrates an embodiment of a view of memory access after the hypervisor emancipates the memory of the guest partition.

FIG. 3 depicts the view of memory access 310 after the hypervisor emancipates the memory of the guest partition to form an emancipated partition. In this view, the primary partition 330 no longer has access to memory areas in use by the emancipated partition 320, except for some areas specifically designated by the hypervisor and/or the emancipated partition as in I/O channel 332. In particular, as part of emancipation, the hypervisor changes the GPA-to-SPA (guest physical address-to-system physical address) of the primary partition to point to a decoy page 340. After emancipation, a read from an emancipated area of the emancipated partition's memory by the primary partition returns a pre-set arbitrary pattern (string of 0xff). A write to an emancipated area of the guest memory by the primary partition can be trapped by the hypervisor and can be disregarded or ignored by the hypervisor.

The hypervisor can safeguard the hypervisor's own memory from unwarranted access by the primary partition using this same process. The hypervisor protection can be setup by modifying the GPA-to-SPA map of the primary partition so that GPA addresses corresponding to hypervisor memory pages point to a decoy page. The remaining pages of memory, including the memory in use by an unprotected guest partition may be available to the primary partition.

Figure 4:
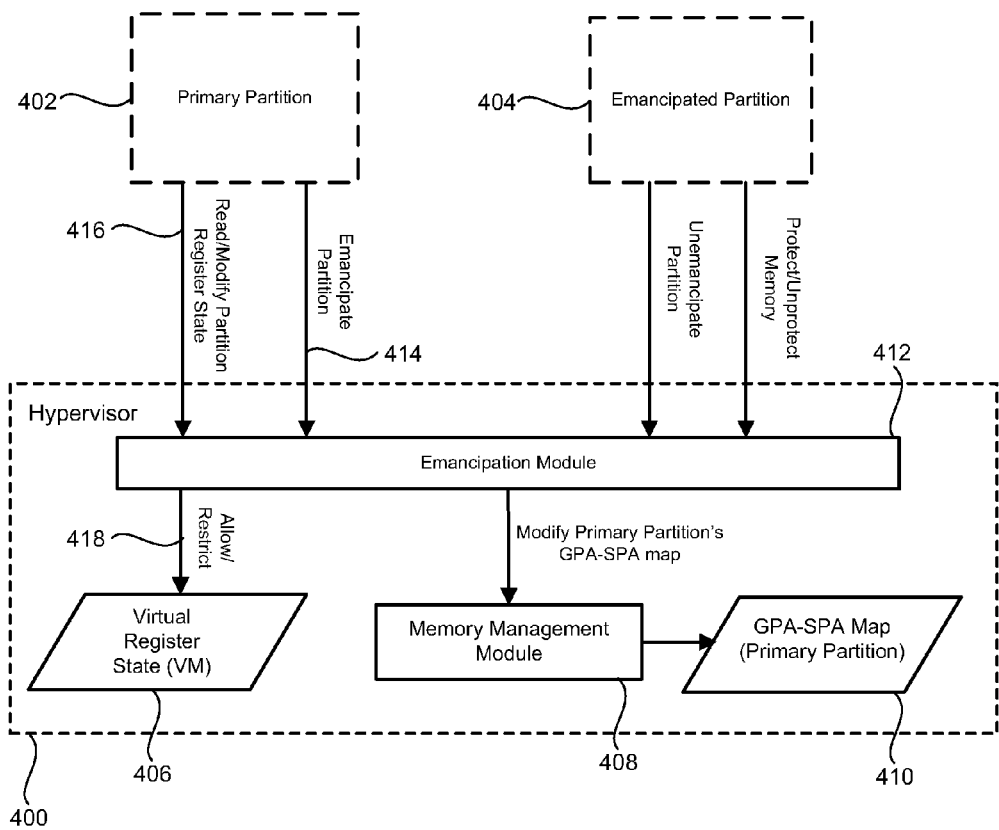
FIG. 4 is a block diagram illustrating an embodiment of a system for protection of virtual machines executing on a host device with additional details about an example hypervisor.

FIG. 4 is a block diagram illustrating an embodiment of the hypervisor 400 and modules that may be internal to the hypervisor. FIG. 4 illustrates more concrete implementation details for the hypervisor as compared to the more abstract representation of a similar system in FIG. 1. The hypervisor can manage a primary partition 402 and an emancipated partition 404 that are executing in the virtualized management environment. The hypervisor can include an emancipation module 412 that can emancipate a partition upon receiving a request from a module authorized to make an emancipation request. For example, a request to emancipate a partition 414 can be made by the primary partition. Alternatively, the request to emancipate a partition can come from the guest partition desiring to be emancipated or through a user interface to the hypervisor. The emancipation module can communicate with the other hypervisor components and can expose a communication and functional interface to the primary partition and guest partitions.

Once a partition has been emancipated by the hypervisor then read operations, write operations, or register state operations 416 that may be requested by the primary partition for the emancipated partition will be routed through the hypervisor. For example, if the primary partition makes a request to modify the virtual register state 406 of an emancipated partition, the hypervisor may either allow or restrict 418 the access to the virtual register state depending on the type of request made and whether the hypervisor or the emancipated partition is configured to allow the type of change requested.

FIG. 4 illustrates the virtual register state as being logically controlled by the hypervisor but the physical memory location may not necessarily be located within the hypervisor. For example, the virtual register state may reside outside of the hypervisor in a separate protected and/or trusted partition.

In order to emancipate the guest partition, the access to the guest partition's memory can be restricted. This restriction can be setup when the emancipation module 412 makes a request to the memory management module 408 to modify the GPA-to-SPA map (guest physical address-to-system physical address map) 410 for the primary partition. This modification results in primary partition's memory pointers that are pointed to the emancipated partition's memory being re-pointed to a decoy page which restricts the primary partition's access to the emancipated partition's memory.

The present technology can modify the hypervisor's security model and may disconnect the security dependency between a guest partition and the primary partition. As a result, the trusted computing base (TCB) in a virtualized environment can be restructured so the TCB of an emancipated partition includes the hypervisor and the hypervisor's TCB and does not include either the primary partition or the primary partition's TCB. This makes the TCB of an emancipated partition smaller than the TCB of a guest partition that is not emancipated.

Figure 5:
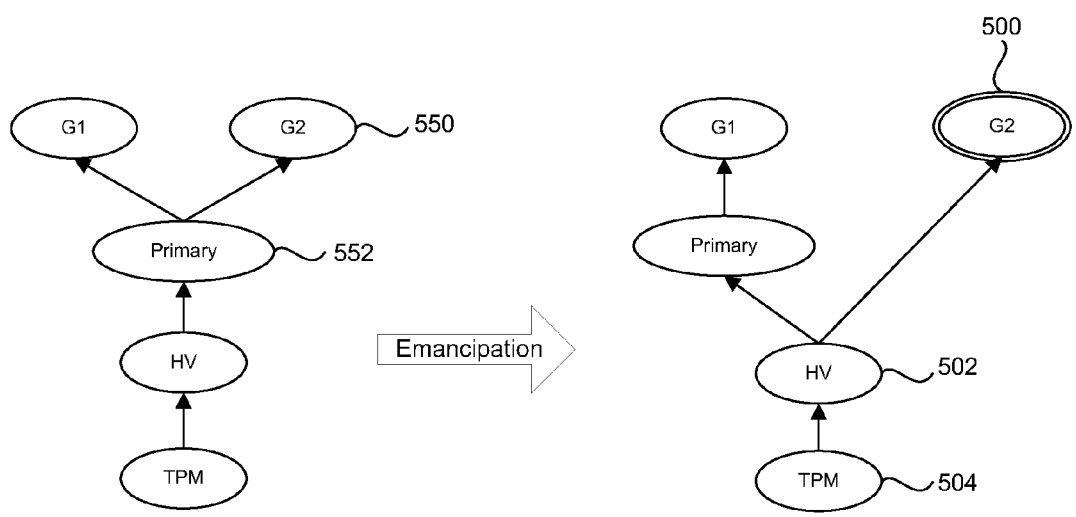
FIG. 5 illustrates that emancipation can limit the trusted computing base (TCB) of an emancipated guest partition.

FIG. 5 illustrates that emancipation can limit the trusted computing base (TCB) of an emancipated guest partition 500 to the hypervisor 502 and to the verified functionality of certain hardware devices in control of the hypervisor, including a trusted platform module (TPM) 504. The TCB of an emancipated partition may be much smaller than the TCB for a guest partition that is not emancipated. In the past, the TCB of a guest partition 550 included the primary partition 552, and the operating system code, user space privileged code, and privileged users (administrators) of the primary partition. Having a smaller TCB is a step toward building more trustworthy virtualized systems, because the behavior of a virtual machine with a limited TCB can more confidently rely on the correct functionality of a limited number of components beyond the partitions own code and/or data. A smaller TCB with smaller attack surface (i.e., smaller external interface with which external entities can interact) is more amenable to verification and easier to defend against malware and rogue users than a large TCB with big attack surface.

Figure 6:
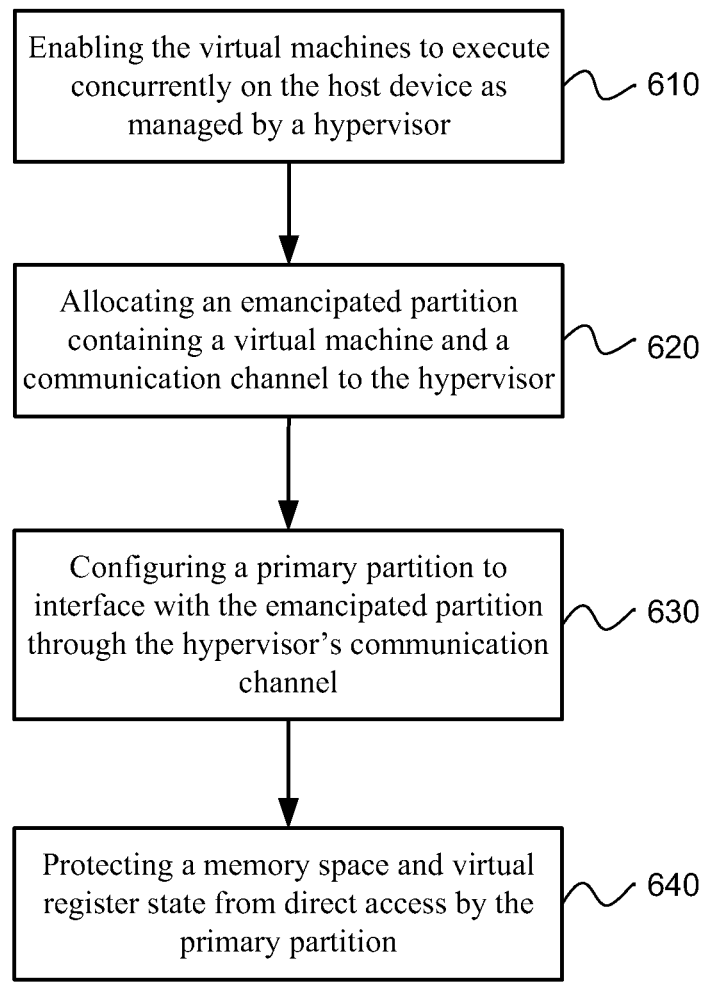
FIG. 6 is flowchart illustrating an embodiment of a method for protection of virtual machines in a virtualized execution environment.

FIG. 6 illustrates a method for protection of virtual machines in an execution environment. The method may include the operation of enabling the virtual machines to execute concurrently on the host device as managed by a hypervisor, as in block 610. The virtual machines can execute on a host device having host processors and host memory. The primary partition can directly access the memory space managed by the hypervisor. An emancipated partition can be allocated with a communication channel to the hypervisor, as in block 620. The emancipated partition can be a virtual machine.

A primary partition can also be configured and setup. The communications from the primary partition to the emancipated partition can be routed through the hypervisor, as in block 630. The primary partition can be configured to interface with the emancipated partition through the hypervisor.

An emancipated memory space and virtual register state are protected from direct access by the primary partition, as in block 640. In other words, the hypervisor can enforce access control to the virtualized register state and memory space of an emancipated partition based on the emancipation state of the emancipated partition. For example, the hypervisor can change the GPA-to-SPA map (guest physical address-to-system physical address map) of the primary partition to point to a decoy page instead of memory pages of the emancipated partition. Thus, the primary partition may not be able to access information owned by the emancipated partition unless the hypervisor or emancipated partitions provide the desired access. The emancipated state can be set when the emancipated partition is allocated. When the emancipated state is not needed for the virtual machine then the protections can be removed from the emancipated partition managed by the hypervisor, as discussed previously.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

Furthermore, the described features, structures, or characteristics may be combined in any suitable manner in one or more embodiments. In the preceding description, numerous specific details were provided, such as examples of various configurations to provide a thorough understanding of embodiments of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

The invention claimed is:

1. A method for protection of virtual machines in an execution environment, comprising:
    enabling the virtual machines to execute concurrently in guest partitions on a host device as managed by a hypervisor on the host device, the host device comprising host processors and host memory, wherein the virtual machines execute concurrently in the guest partitions external to the hypervisor;
    allocating an emancipated partition containing a virtual machine and a communication channel between the emancipated partition and the hypervisor, the emancipated partition being a guest partition that is emancipated from direct access by any other partition based on a request from the guest partition, the any other partition including a primary partition;
    configuring the primary partition to interface with the emancipated partition through the hypervisor's input/output communication channel to the emancipated partition; and
    protecting emancipated memory space and virtual register state from direct access by the primary partition except a portion of the emancipated memory space as designated by the emancipated partition and the hypervisor for input and output.

2. The method as in claim 1, further comprising removing protections from the emancipated partition managed by the hypervisor.

3. The method as in claim 1, further comprising limiting communications from the primary partition to the emancipated partition to communications routed and validated only through the hypervisor.

4. The method as in claim 1, further comprising enforcing access control to the virtualized register state of the emancipated partition based on emancipation state of the emancipated partition.

5. A system for protection of virtual machines in an execution environment on a host device, comprising:
    one or more host processors to execute instructions from a host memory;
    a hypervisor configured to enable the virtual machines to execute concurrently on the host device, wherein virtual machines contain an operating system instance;
    an emancipated partition with a communication channel controlled by the hypervisor;
    a primary partition configured to interface with the emancipated partition through the hypervisor's input/output communication channel to the emancipated partition;
    an emancipated memory space and virtual register state that are protected from direct memory access by the primary partition; and
    a release module, executed by the one or more host processors on the host device, in communication with the hypervisor to enable the emancipated partition to leave an emancipated state by removing protections managed by the hypervisor around resources used by the emancipated partition, wherein leaving the emancipated state permits direct memory access of unprotected resources of the guest partition by the primary partition.

6. The system as in claim 5, further comprising a virtualized I/O channel provided between the primary partition and the emancipated partition, wherein the hypervisor selectively disables protection of memory pages to provide the virtualized I/O channel.

7. The system as in claim 6, further comprising I/O device drivers in the emancipated partition to copy data in and out of the virtualized I/O channel.

8. The system as in claim 7, wherein the I/O device drivers for the emancipated partition use encryption for data accessed via the virtualized I/O channel.

9. The system as in claim 7, wherein the I/O device drivers for the emancipated partition use integrity protection data structures to ensure that data accessed via the virtualized I/O channel has not been modified by the primary partition.

10. One or more computer storage devices, excluding carrier waves and propagated signals, storing computer-executable instructions for executing on a computer system a computer process for protection of a virtual machine in an execution environment, the computer process comprising:
    enabling the virtual machine to execute in a guest partition on a host device as managed by a hypervisor on the host device having host processors and host memory, wherein the guest partition is created by a primary partition;
    emancipating the guest partition from direct access by the primary partition based on a request from the guest partition;
    configuring the primary partition to interface with the emancipated guest partition through a hypervisor's input/output communication channel; and
    protecting a memory space and virtual register state of the emancipated guest partition from direct access by the primary partition.

11. The one or more computer storage devices of claim 10 wherein the memory space of the emancipated guest partition is protected by modifying guest physical address-to-system physical address (GPA-to-SPA) map for the primary partition based on type of the request.

12. The one or more computer storage devices of claim 11 wherein the modifying GPA-to-SPA map further comprises pointing the primary partition memory pointers from the emancipated guest partition memory area to a decoy page.

13. The one or more computer storage devices of claim 10 further storing computer-executable instructions for executing on the computer system the computer process for protection of the virtual machine in the execution environment, the computer process further comprises providing a virtualized I/O channel between the primary partition and the emancipated guest partition, wherein the hypervisor allows the emancipated guest partition to indirectly and selectively disable protection of memory pages to provide the virtualized I/O channel.

14. The one or more computer storage devices of claim 13 storing computer-executable instructions for executing on the computer system the computer process for protection of the virtual machine in the execution environment, the computer process further comprises copying data in and out of the virtualized I/O channel between the guest partition and the primary partition.

15. The one or more computer storage devices of claim 14 storing computer-executable instructions for executing on the computer system the computer process for protection of the virtual machine in the execution environment, the computer process further comprises using integrity protection data structures to ensure that the data communicated via the virtualized I/O channel has not been modified.

16. The one or more computer storage devices of claim 10 wherein the hypervisor uses page-table checking to determine areas of memory a primary partition is able to access.

17. The one or more computer storage devices of claim 10 wherein the hypervisor protects its own memory from the primary partition.

18. The one or more computer storage devices of claim 10 storing computer-executable instructions for executing on the computer system the computer process for protection of the virtual machine in the execution environment, the computer process further comprises unemancipating the guest partitioning and allowing direct access by the primary partition.

19. The one or more computer storage devices of claim 18 wherein the unemancipating comprises removing any protected information contained by the emancipated partition.

20. The one or more computer storage devices of claim 10 storing computer-executable instructions for executing on the computer system the computer process for protection of the virtual machine in the execution environment, the computer process further comprises allowing a user to disable or enable the direct access by the primary partition.

\* \* \* \* \*